Figure 1:
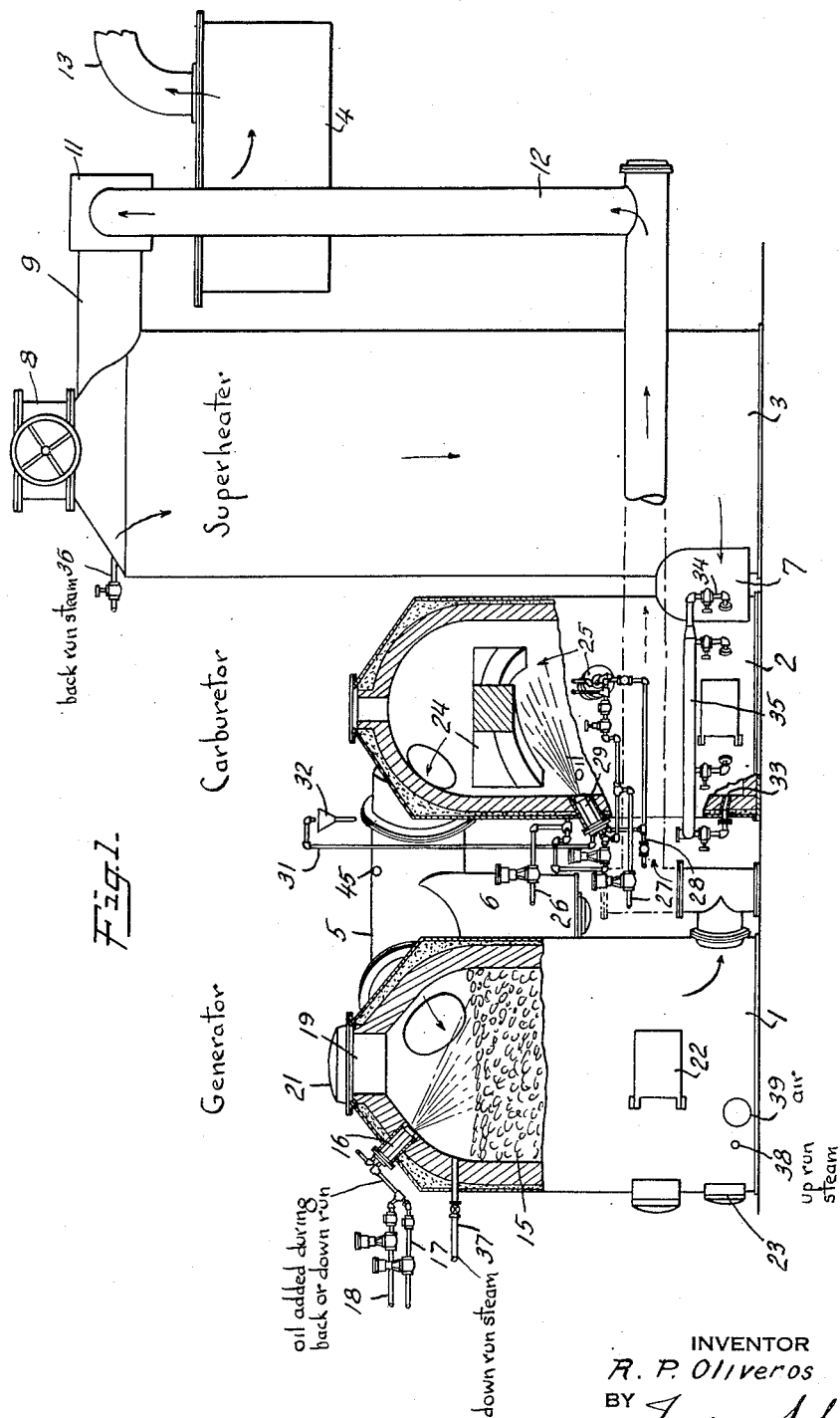

July 14, 1936.   R. P. OLIVEROS   2,047,518
PROCESS OF MAKING CARBURETED WATER GAS
Filed Jan. 5, 1934   2 Sheets-Sheet 2

INVENTOR
R. P. Oliveros
BY
ATTORNEY

Patented July 14, 1936

2,047,518

UNITED STATES PATENT OFFICE 2,047,518

PROCESS OF MAKING CARBURETED WATER GAS

Reginald P. Oliveros, Brooklyn, N. Y., assignor to Semet-Solvay Engineering Corporation, New York, N. Y., a corporation of New York Application January 5, 1934, Serial No. 705,351

7 Claims. (Cl. 48—208)

This invention relates to carbureted water gas manufacture, and more particularly, to a process of making carbureted water gas involving both an uprun of steam and a backrun of steam through the fuel bed, the resultant uprun and backrun water gas being enriched by the addition of oil into the carburetor and generator, respectively.

Carbureted water gas making procedures involving the following steps are well known: (1) the blasting of the fuel bed, which may be of coal or coke, with air and the burning of the resultant blast gases in the carburetor and superheater to heat these units; (2) an uprun gas making step involving the passage of steam up through the fuel bed and the passage of the resultant water gas from the generator into the carburetor where it is enriched with oil which may be crude oil, such as Bunker C oil, the resultant carbureted water gas being passed from the carburetor into and through the superheater where the gas is fixed; and (3) a backrun step involving the passage of steam in reverse flow through the set, the steam being passed through the superheater and carburetor and the thus superheated steam introduced into the top of the generator concurrently with the spraying of crude oil onto the top of the fuel bed in the generator. The resultant mixture of oil vapor and steam is passed through the fuel bed and the carbureted water gas thus produced withdrawn from the generator. In such processes, steam at a substantially constant velocity was passed through the fuel bed; i. e., throughout the backrun step, per unit of time a like amount of steam was passed through the fuel bed.

I have found that the introduction of oil onto the fuel bed of the generator in such backrun water gas making processes as hereinabove briefly outlined places an additional burden on the fuel bed and reduces the gas making efficiencies of the process. This may be explained on the theory that the addition of oil to the fuel bed concurrently with the passage of steam therethrough results in the production of oil gas which is passed with the steam through the fuel bed, increasing the velocity of the gas mixture through the fuel bed, and consequently, reducing the time of contact between the steam and oil vapors on the one hand and the incandescent fuel on the other, with consequent decrease in gas making efficiencies. Such increased velocities also cause the gas stream passing through the fuel bed to carry carbon particles away from the fuel bed, resulting in fuel losses. Furthermore, the decomposition of the oil in the production of oil gas and the reaction of steam with the fuel bed are both endothermic reactions. When both reactions take place concurrently during the backrun, the temperature of the fuel bed is reduced at a high rate with consequent reduction of the temperature of the fuel bed to a point below gas making temperatures before the backrun step is completed, thereby resulting in a decrease in the gas making efficiency of the set. A longer blowing period is required to restore the fuel bed to satisfactory gas making temperatures, with consequent loss of fuel.

In accordance with this invention, the backrun step is divided into what might well be considered two portions. A reduced amount of steam, as compared with heretofore customary procedure, is passed through the fuel bed during the first portion of the step and oil is concurrently introduced onto the fuel bed. If desired, an increased amount of steam may be passed through the fuel bed during the second portion of the step. The total amount of steam passed through the fuel bed during the backrun step is preferably less, but may be substantially the same, as that heretofore customarily passed through the fuel bed during the backrun.

By reducing the amount of steam passed through the fuel bed during the introduction of oil onto the fuel bed, the velocity of gas flow through the fuel bed is reduced. Hence, more effective contact between the steam and oil vapors on the one hand and the fuel bed on the other hand results and improved efficiencies are obtained. For example, in practice, as compared with normal backrun operation involving the passage of 140 pounds of steam per minute during the backrun and the introduction of 15 gallons of oil into the generator during the backrun, in accordance with this invention steam in an amount of 60 pounds per minute was passed through the fuel bed during the first minute and three seconds of the backrun step. Fifteen gallons of oil were introduced onto the fuel bed during the one-minute interval of the initial portion of the step. Upon the completion of the introduction of the oil, 175 pounds of steam per minute were passed through the fuel bed. This portion of the backrun step lasted approximately fifty-seven seconds. Operating in accordance with this procedure, it was found that it required only 17.8 pounds of coke per thousand cubic feet of gas. This compares with 20.7 pounds of coke per thousand cubic feet of gas required in normal backrun operations with oil introduction into the generator during the backrun. The gas produced was of 540 B. t. u. per cubic foot which compares with 535 B. t. u. gas produced in normal operation. The total amount of oil employed in the generator and carburetor was 3.96 gallons per thousand cubic feet of gas which compares with 3.93 gallons in normal operation. It will be noted that the process of this invention results in the saving of approximately three pounds of coke per thousand cubic feet of gas.

In the accompanying figures of the drawings, illustrating preferred embodiments of apparatus for practicing the process of this invention—

Figure 2:
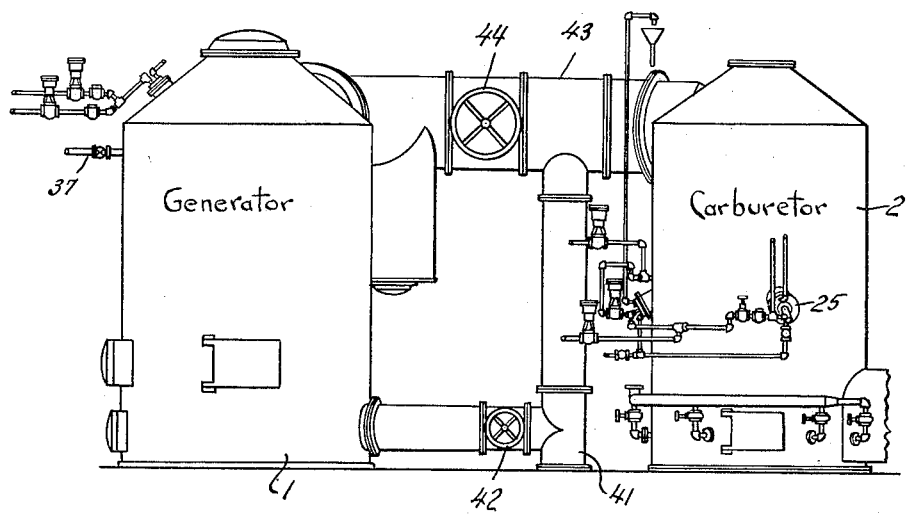

Fig. 1 is a side elevation, partly in section, of a water gas set equipped to practice this invention; and Fig. 2 is a fragmentary side elevation of a modified form of set which may be employed in practicing this invention.

Referring to the drawings, with particular reference to Fig. 1, there is shown a backrun water gas set comprising a generator 1, a carburetor 2, a superheater 3, and a washbox 4. The top portion of generator 1 communicates with the top portion of carburetor 2 by means of a pipe 5 provided with a dust catcher 6, as is well known in the art. The base of the carburetor communicates with the superheater by means of a connection 7. The top of the superheater is provided with a blast valve 8 and a gas offtake 9 leading into a casing 11 equipped with a three-way valve. Casing 11 communicates with the washbox 4 by a pipe (not shown) and also with a backrun pipe 12 leading into the base portion of the generator. The valve in casing 11, as is well known, is adapted to control flow through the set being designed to open the backrun line to the washbox 4 and simultaneously close the line leading from the superheater into the washbox and vice versa. The washbox is equipped with a gas offtake 13.

As customary, the generator is provided with a grate (not shown) supporting the fuel bed 15, which may be of coal or coke. At the top of the generator, preferably disposed in the side remote from the pipe 5, is an oil spray 16 equipped with valve-controlled lines 17 and 18 for supplying oil and steam to the spray. A charging hole 19, arranged to be closed by a suitable cover 21, is provided at the top of the generator and poking and ash removal openings 22, 23 adapted to be closed by doors are disposed around the circumferential surface of the base portion of the generator.

The carburetor is of the improved type disclosed and claimed in the copending application of Charles H. Hughes, Serial No. 542,271, filed June 5, 1931. Briefly stated, the carburetor involves refractory walls 24 bonding with the refractory lining of the carburetor and disposed at the top thereof immediately below the gas inlet. Positioned beneath the refractory walls 24 about the circumferential surface of the carburetor are a plurality of upwardly directed oil sprays 25. Each oil spray is supplied with oil and steam from the main valve-controlled oil and steam lines 26, 27 which are connected to the oil sprays by branch lines as shown on the drawings. The oil sprays are water-cooled, water being supplied from a valve-controlled water line 28 to a casing 29 surrounding each oil spray. The water leaves each casing through a pipe 31, each individual to a casing. Each pipe 31 discharges into a funnel 32 communicating with a suitable disposal point. Disposed at the base of the carburetor are a plurality of air inlets 33, each supplied with air by means of valve-controlled pipes 34 communicating with air main 35.

A steam jet 36 for supplying backrun steam to the superheater leads into the top portion thereof. The generator may be provided with a valve-controlled steam jet 37 for supplying downrun steam thereto. An uprun steam inlet 38 and the usual air blast admission means indicated by reference numeral 39 lead into the base of the generator below the grate.

The apparatus of Fig. 2 differs from that of Fig. 1 chiefly in that the generator 1 is provided with a pipe 41 flow through which is controlled by valve 42. Pipe 41 leads into the connection 43 between the generator and the carburetor. A hot valve 44 controls flow from the top of the generator into the top of the carburetor. In the apparatus of Fig. 2, a downrun may be made by introducing steam into the generator through steam jet 37.

In operation, blasting air or other oxygen-containing gas is introduced through 39 and passed up through the fuel bed in the generator until the fuel bed is brought to an incandescent state, the resultant blast gases being passed through pipe 5 where they are admixed with secondary air, admitted through inlet 45. The mixture of air and blast gases is ignited upon contact with the ignition arches 24 and burned in the carburetor and superheater, thus heating these chambers. The products of combustion leave the superheater through the blast valve 8. During the blasting step, additional air is introduced through inlets 33 to support the combustion of any carbonaceous material deposited in the base of the carburetor by decomposition of oil introduced thereinto during the preceding carbureted water gas making cycle as will be more fully disclosed hereinafter.

At the completion of the blasting step, which may be of approximately one minute and twenty seconds duration, an uprun is performed, steam being introduced at 38 and passed through the fuel bed, the resultant water gas passing through the carburetor where it is enriched with oil introduced through sprays 25, the mixture of oil vapors and steam passing through the carburetor and into and through the superheater filled with checkerbrick and thence through pipe 9, washbox 4, through the outlet 13. Any carbonaceous material formed by the decomposition of the oil settles to the bottom of the carburetor, and as hereinabove pointed out, is removed by combustion during a subsequent blasting step, air to support the combustion being introduced through the inlets 33.

In the backrun, the steam is heated upon passage through the superheater and carburetor and reacts with the fuel bed in the generator to form water gas which is enriched by the oil vapors produced by decomposition of oil fed onto the fuel bed. In the case of a downrun, the steam is admitted through jet 37 directly into the generator and passes down through the fuel bed forming water gas which is enriched by the oil vapors produced by decomposition of oil fed onto the fuel bed. The resultant carbureted water gas passes from the base of the generator through the backrun pipe 12 into the washbox 4 and thence through the outlet 13.

In one example of the practice of this invention in a generator having an external diameter of eleven feet, during the uprun step, 140 pounds of steam per minute were passed through the fuel bed. At the completion of the uprun step, which was of one minute and thirty seconds' duration, a backrun step of two minutes' duration followed. During the first minute and three seconds of the backrun step, about 60 pounds of steam per minute were passed through the fuel bed and during the latter minute of this portion of the step, fifteen gallons of oil were fed onto the fuel bed. During the last fifty-seven seconds of the step, 175 pounds of steam per minute were passed through the fuel bed.

The amount of steam passed through the fuel bed in the case of an eleven foot generator during the initial portion of the step may vary from about 5 pounds or less to about 70 pounds per minute, and during the second portion of the step, the amount of steam may vary from about 165 to about 240 pounds of steam per minute.

The operation of the apparatus of Fig. 2 differs from that of Fig. 1 chiefly in that during the downrun step, the carbureted water gas withdrawn from the base of the generator 1, instead of passing through the backrun line 12 directly to the washbox, may be passed through pipe 41 into the carburetor 2, where, if desired, additional carbureting material may be introduced through the oil sprays 25 and the resultant gas passes through the superheater into the washbox 4. During the downrun, valve 42 is opened and valve 44 closed. When performing an uprun in the apparatus of Fig. 2, valve 42 is closed, valve 44 opened. Steam admitted at the base of the generator reacts with the incandescent fuel, the resultant water gas passing into and through the carburetor where it is enriched with oil and the carbureted water gas passed through the superheater (not shown). The amount of steam passed through the fuel bed during that portion of the cycle in which oil is added to the fuel bed may be varied from 5 pounds or less per minute to 60 pounds or more per minute.

It will be understood that the amount of steam passed through the fuel bed will vary depending upon the size of the generator. In heretofore customary backrun operation, in which substantially constant amounts of steam per minute were passed through the fuel bed, the amount of steam per minute passed through the fuel bed varied from about 20 pounds per minute for a four-foot external diameter generator to about 250 pounds per minute for a twelve-foot external diameter generator. The amount of steam per minute passed through the fuel bed in the generator during the initial portion of the backrun step in accordance with this invention may vary from about 4 to about 55 per cent of the amount employed per minute during the back run in heretofore customary backrun operation. Preferably, about 42 per cent of the amount of steam per minute employed in heretofore customary backrun operation is passed per minute through the fuel bed during the initial portion of the backrun step when operating in accordance with this invention. During the second portion of the step, the amount of steam per minute passed through the fuel bed may vary from about 100 to about 200 per cent of the amount of steam per minute passed through the fuel bed during the backrun in heretofore customary backrun operation. Preferably, however, about 125 per cent of the amount of steam per minute passed through the fuel bed in heretofore customary backrun operation is passed per minute through the fuel bed during the second portion of the backrun step when operating in accordance with this invention.

It will be noted that in accordance with my invention, the velocity of the gases through the fuel bed during that portion of the backrun step in which oil is fed onto the fuel bed is reduced. Hence, the fuel bed acts more efficiently as a filter to remove carbon from the gas which carbon reacts with steam to form water gas. This results in an economy in the fuel requirements for the process. In actual practice, as hereinabove pointed out, approximately 17.8 pounds of coke were required per thousand cubic feet of gas. This compares with 20.7 pounds of coke required in prior backrun procedure as hereinabove pointed out.

It is to be understood that this invention is not restricted to the present disclosure otherwise than defined by the appended claims, and that modification in the process disclosed may be made without departing from the invention. For example, the steam may be passed through the fuel bed in gradually increasing amounts and oil added to the fuel bed in gradually decreasing amounts such that during the passage of the minimum amount of steam per unit of time through the fuel bed, the maximum amount of oil is added thereto and during the passage of the maximum amount of steam through the fuel bed, no oil or the minimum amount of oil is passed thereonto.

I claim:

1. The improvement in a backrun process of making carbureted water gas involving the air blasting of the fuel bed to heat the same to incandescence and the burning of the resultant blast gases in a carburetor and superheater, an uprun of steam through the fuel bed with the carbureting of the resultant water gas in the carburetor by the addition of crude oil and the passage of the resultant mixture of gases through the superheater and a backrun of steam which is passed through the fuel bed in the generator, oil being added to the fuel bed in the generator and the mixture of oil vapors and steam being passed through the generator, which comprises passing through the fuel bed concurrently with the introduction of the oil thereonto, an amount of steam per minute equal to from about 4 to about 55 per cent of the amount of steam normally passed per minute through the fuel bed during the backrun, discontinuing the introduction of oil onto the generator and then passing per minute from 100 to 200 per cent of the amount of steam per minute normally passed through the fuel bed during the backrun.

2. The improvement in a backrun process of making carbureted water gas involving the air blasting of the fuel bed to heat the same to incandescence and the burning of the resultant blast gases in a carburetor and superheater, an uprun of steam through the fuel bed with the carbureting of the resultant water gas in the carburetor by the addition of crude oil and the passage of the resultant mixture of gases through the superheater, and a backrun of steam which is passed through the fuel bed in the generator, oil being added to the fuel bed in the generator and the mixture of oil vapors and steam being passed through the generator, which comprises passing through the fuel bed concurrently with the introduction of the oil thereonto an amount of steam per minute equal to about 42 per cent of the amount of steam normally passed per minute through the fuel bed during the backrun, discontinuing the introduction of oil onto the generator and then passing per minute about 125 per cent of the amount of steam per minute normally passed through the fuel bed during the back run.

3. The process of making carbureted water gas in a set comprising a generator containing a bed of fuel, a carburetor and a superheater connected in series, a gas offtake leading from the base of the generator and a gas offtake from the superheater, which comprises blasting the fuel bed of said generator with air and burning the resultant blast gases in the carburetor and superheater, passing steam up through said fuel bed and passing the resultant water gas into the carburetor, introducing oil into said carburetor and passing the resultant carbureted water gas through the carburetor and superheater, discontinuing the aforesaid uprun gas making step and performing a backrun step involving the introduction of not more than 70 pounds per minute of steam into the superheater and passing the steam through the superheater and carburetor into the generator, introducing crude oil into the generator and passing the resultant oil vapor and steam mixture through the fuel bed, discontinuing the introduction of oil into the generator and passing an increased amount of steam per minute into the superheater and carburetor and into and through the fuel bed in the generator, and withdrawing the resultant water gas from the generator.

4. The process of making carbureted water gas in a set comprising a generator containing a bed of fuel, a carburetor and a superheater connected in series, a gas offtake leading from the base of the generator and a gas offtake from the superheater which comprises blasting the fuel bed of said generator with air and burning the resultant blast gases in the carburetor and superheater, passing steam up through said fuel bed and passing the resultant water gas into the carburetor, introducing oil into said carburetor and passing the resultant carbureted water gas through the carburetor and superheater, discontinuing the aforesaid uprun gas making step and performing a backrun step involving the introduction of not more than 70 pounds per minute of steam into the superheater and passing the steam through the superheater and carburetor into the generator, introducing crude oil into the generator and passing the resultant oil vapor and steam mixture through the fuel bed, discontinuing the introducing of oil into the generator and passing about 175 pounds of steam per minute into the superheater and carburetor and into and through the fuel bed in the generator, and withdrawing the resultant water gas from the generator.

5. The improvement in the process of making carbureted water gas involving the air blasting of the fuel bed to heat the same to incandescence, an up run of steam through the fuel bed and a down run of steam and oil, which comprises modifying the down run so that steam at substantially different velocities is introduced into and passed through the fuel bed, steam at lower velocity being introduced during the first portion of the down run, and at least the major portion of the oil being introduced onto the fuel bed concurrently with the passage of steam at lower velocity through the fuel bed.

6. In the improvement in the process of making carbureted water gas involving the steps of (1) air blasting the fuel bed, (2) the passage of steam through the fuel bed, and (3) the passage of steam through the fuel bed in a reverse direction as compared with the direction of flow during step (2), liquid hydrocarbon being added to the fuel bed during at least one of the steam steps, which improvement comprises modifying said steam step to which liquid hydrocarbon is added so that steam at substantially different velocities is introduced into and passed through the fuel bed, steam at lower velocity being passed through the fuel bed during one portion of this step and steam at higher velocity during the remainder of this step, the liquid hydrocarbon being introduced into the fuel bed concurrently with the passage of steam at lower velocity through the fuel bed.

7. The improvement in the process of making carbureted water gas involving the air blasting of the fuel bed to heat the same to incandescence, an up run of steam through the fuel bed and a down run of steam and oil, which comprises modifying the down run so that steam at substantially different rates is passed through the fuel bed, steam at a lower rate being passed through the fuel bed during one portion of the down run and at least a major portion of the oil being introduced onto the fuel bed concurrently with the passage of steam at a lower rate through the fuel bed, and steam at a greater rate being passed through the fuel bed during the remainder of the down run step.

REGINALD P. OLIVEROS.